(12) United States Patent
Yellapantula et al.

(10) Patent No.: US 8,660,063 B2
(45) Date of Patent: Feb. 25, 2014

(54) METHOD AND APPARATUS FOR CELL DETECTION IN A WIRELESS COMMUNICATION SYSTEM

(75) Inventors: Ramakrishna Yellapantula, Libertyville, IL (US); Karthik Nagasubramanian, Mundelein, IL (US); Brett Robertson, Mundelein, IL (US)

(73) Assignee: Intel Corporation, Santa Clara, CA (US)

( * ) Notice: Subject to any disclaimer, the term of this patent is extended or adjusted under 35 U.S.C. 154(b) by 683 days.

(21) Appl. No.: 12/842,469

(22) Filed: Jul. 23, 2010

(65) Prior Publication Data

US 2012/0020335 A1    Jan. 26, 2012

(51) Int. Cl.
*H04W 4/00* (2009.01)
*H04W 84/08* (2009.01)

(52) U.S. Cl.
CPC .................................... *H04W 84/08* (2013.01)
USPC ....................................................... 370/328

(58) Field of Classification Search
USPC ................................. 370/328, 503
See application file for complete search history.

(56) References Cited

U.S. PATENT DOCUMENTS

| | | | |
|---|---|---|---|
| 7,158,595 B2 | 1/2007 | Yang et al. | |
| 7,411,983 B2* | 8/2008 | Jo et al. | 370/503 |
| 8,396,170 B2* | 3/2013 | Luo et al. | 375/340 |
| 2002/0142778 A1* | 10/2002 | Saito | 455/450 |
| 2002/0181634 A1 | 12/2002 | Yang et al. | |
| 2004/0022273 A1 | 2/2004 | Jo et al. | |
| 2004/0032836 A1* | 2/2004 | Grilli et al. | 370/252 |
| 2005/0262419 A1* | 11/2005 | Becker et al. | 714/758 |
| 2007/0245216 A1* | 10/2007 | Kim | 714/758 |
| 2008/0005639 A1* | 1/2008 | Frederiksen | 714/751 |
| 2010/0174973 A1* | 7/2010 | Landschaft et al. | 714/807 |
| 2010/0309840 A1* | 12/2010 | Umesh et al. | 370/328 |
| 2011/0058489 A1* | 3/2011 | Ueno | 370/252 |
| 2012/0020335 A1* | 1/2012 | Yellapantula et al. | 370/336 |

* cited by examiner

*Primary Examiner* — Phuongchau B Nguyen
(74) *Attorney, Agent, or Firm* — Schwabe, Williamson & Wyatt, P.C.

(57) ABSTRACT

A method (300) and apparatus (200) for cell detection in a wireless communication system may include acquiring (315), using a transceiver, synchronization to first radio frame boundaries of a first physical channel from a cell. The method may include attempting to decode frames (320) of a second physical channel that has second radio frame boundaries that are a multiple of the first radio frame boundaries. The method may include performing (325) a cyclic redundancy check on the frames of the second physical channel. The method may include extracting (345) predictable information from a payload from frames that fail the cyclic redundancy check.

13 Claims, 5 Drawing Sheets

METHOD AND APPARATUS FOR CELL DETECTION IN A WIRELESS COMMUNICATION SYSTEM

BACKGROUND

1. Field

The present disclosure is directed to a method and apparatus for cell detection in a wireless communication system. More particularly, the present disclosure is directed to extracting information from frames of a physical channel for cell detection.

2. Introduction

Cellular communication devices used in today's society include mobile phones, personal digital assistants, portable computers, and various other electronic communication devices. A cellular communication device communicates with a cellular network by sending and receiving signals to and from a base station in a cell. To communicate with the cell, the cellular communication device must first synchronize with the cell. To synchronize with the cell, the cellular communication device extracts information from a payload from frames of a physical channel of the cell. After the cellular communication device synchronizes with the cell, the cellular communication device considers the cell available for communications.

For example, in a universal mobile telecommunication system, a cellular communication device must perform multiple primary common control physical channel (PCCPCH) decoding attempts over successive radio frames to extract a system frame number (SFN). The cellular communication device then uses successful cyclic redundancy check (CRC) decoding as the sole criterion to validate the received system frame number and thereby consider the cell available for communications.

The cell system frame number is transmitted via a broadcast channel, such as the primary common control physical channel, of each cell to allow the cellular communication device to detect each cell through framing and timing. Cyclic redundancy checks are used to detect any block errors. Unfortunately, under low signal conditions, all the decoding attempts may fail the cyclic redundancy check, but the transmitted system frame numbers are not necessarily corrupted. Thus, even though the cellular communication device is able to synchronize to the cell, the cellular communication device instead ignores the cell because it erroneously determines it cannot extract information from a payload from frames of the PCCPCH of the cell. This limits the availability of cells that the cellular communication device can use for communicating with a network.

Thus, there is an opportunity for a different method and apparatus for cell detection in a wireless communication system.

BRIEF DESCRIPTION OF THE DRAWINGS

In order to describe the manner in which advantages and features of the disclosure can be obtained, various embodiments will be illustrated in the appended drawings. Understanding that these drawings depict only typical embodiments of the disclosure and do not limit its scope, the disclosure will be described and explained with additional specificity and detail through the use of the drawings in which.

DETAILED DESCRIPTION

A method and apparatus for cell detection in a wireless communication system is disclosed. The method may include acquiring, using a transceiver, synchronization to first radio frame boundaries of a first physical channel from a cell. The method may include attempting to decode frames of a second physical channel that has second radio frame boundaries that are a multiple of the first radio frame boundaries. The method may include performing a cyclic redundancy check on the frames of the second physical channel. The method may include extracting predictable information from a payload from frames that fail the cyclic redundancy check.

Figure 1:
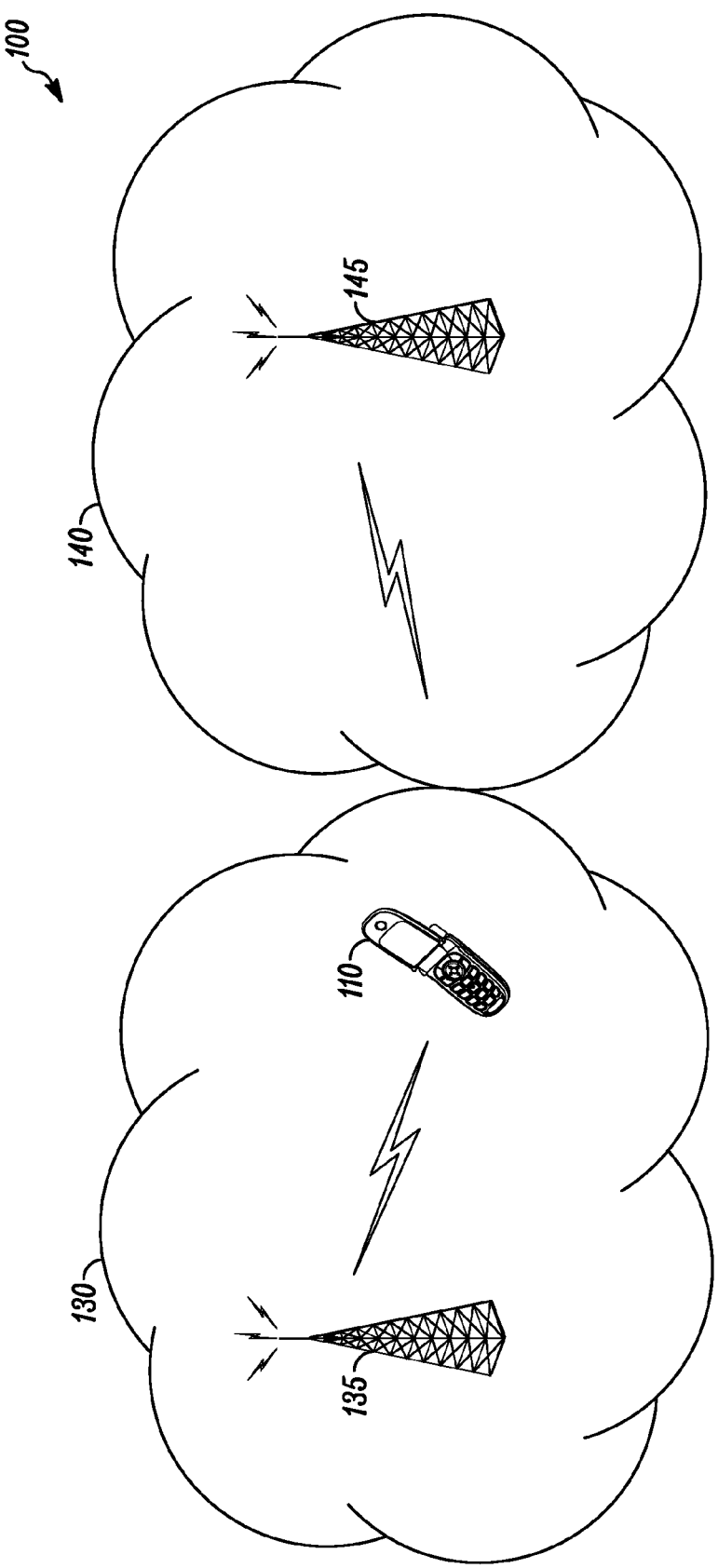
FIG. 1 illustrates an example diagram of a system in accordance with one embodiment.

FIG. 1 is an example block diagram of a system 100 according to one embodiment. The system 100 can be part of a wireless telecommunication system, such as a Universal Mobile Telecommunication System (UMTS), a cellular telephone system, a Time Division Multiple Access (TDMA)-based system, a Code Division Multiple Access (CDMA)-based system, a satellite communications system, and other wireless telecommunications systems. Furthermore, the system 100 may include more than one system and may include a plurality of different types of systems. Thus, the system 100 may include a plurality of data networks, a plurality of telecommunications networks, a combination of data and telecommunications networks and other like communication systems capable of sending and receiving communication signals.

The system 100 can include a terminal 110, a first cell 130 having a first base station 135, and a second cell 140 having a second base station 145. The terminal 110 may be a user equipment, such as a wireless communication device, a wireless telephone, a cellular telephone, a personal digital assistant, a pager, a personal computer, a selective call receiver, or any other device that is capable of sending and receiving communication signals on a network including a radio access network. The base stations 135 and 145 may be cellular base stations, wireless local area network access points, or any other devices that provides access between a wireless device and a network.

During a cell search procedure, the terminal 110 can acquire primary common control physical channel radio frame timing, which can be used to determine radio frame timing of all common physical channels. The terminal 110 can use a synchronization channel primary synchronization code to acquire slot synchronization to a cell, such as the cell 140. The terminal 110 can then use the synchronization channel's secondary synchronization code to find frame synchronization and identify the code group of the cell 140. Next, the terminal 110 can determine the exact primary scrambling code used by the found cell 140. After the primary scrambling code has been identified, the primary common control physical channel can be detected and the terminal 110 can validate the cell system frame number in the primary common control physical channel.

The cell system frame number is transmitted via a broadcast channel, such as the primary common control physical channel, of each cell, such as cells 130 and 140, to enable its detection through framing and timing. The terminal 110 uses cyclic redundancy checks to detect any block errors. The terminal 110 can make multiple primary common control physical channel decoding attempts over successive radio frames and can use successful cyclic redundancy check decoding to validate the received cell system frame number and thereby detection of a cell, such as cell 140. Under low signal conditions, all the decoding attempts may be failures in that they may fail the cyclic redundancy check. However, the received cell system frame numbers may not necessarily be corrupted. To attempt to synchronize to the cell 140 in low signal conditions, the terminal 110 can extract the cell 140 system frame numbers from the frames that are in error and then compute the difference between a local terminal 110 system frame number and the cell 140 system frame number. If the difference is the same across a certain number of decode attempts, the terminal 110 can consider the cell 140 system frame number as valid and can synchronize to the cell 140.

A call performance cell detection stress test was performed to verify the above procedure. In the test, cyclic redundancy checks of primary common control physical channel decode attempts failed for eleven successive frames. The difference between a local terminal system frame number and the cell system frame number for each frame decode attempt is shown in Table 1, where the difference is called the Delta SFN.

TABLE 1

Delta SFN

| Attempt | Delta SFN |
|---|---|
| 1 | 0x762 |
| 2 | 0x249 |
| 3 | 0x3b6 |
| 4 | 0x249 |
| 5 | 0x4a0 |
| 6 | 0x247 |
| 7 | 0x954 |
| 8 | 0x249 |
| 9 | 0x3da |
| 10 | 0x249 |
| 11 | 0x7fe |

The decode attempts were based on primary common pilot channel frame boundaries. The primary common control physical channel frame boundaries are twice as long as the primary common pilot channel frame boundaries. Thus, every other decode attempt can correspond to a primary common pilot channel frame boundary. Therefore, every other Delta SFN value can be split into alternating bins, as shown in Table 2.

TABLE 2

Bins

| Bin 1 | | Bin 2 | |
|---|---|---|---|
| Attempt | Delta SFN | Attempt | Delta SFN |
| 1 | 0x762 | 2 | 0x249 |
| 3 | 0x3b6 | 4 | 0x249 |
| 5 | 0x4a0 | 6 | 0x247 |
| 7 | 0x954 | 8 | 0x249 |
| 9 | 0x3da | 10 | 0x249 |
| 11 | 0x7fe | | |

As shown, the Delta SFN of 0x249 occurred four out of five times in Bin 2, which can indicate the cell system frame number is valid. In this experiment, network information confirmed that the cell system frame number extracted from the primary common pilot channel frame was in fact a valid cell system frame number. The cell system frame number can be extracted from primary common pilot channel frames that fail the cyclic redundancy check because bit error probability can be higher near the trellis terminations, such as the end of the encoded payload of the primary common pilot channel frame, while the system frame number can be transmitted in the first 11 bits of the payload.

The disclosed methods and devices can also be used in other situations where blocks are transmitted repeatedly or with deterministic changes. Other such situations may utilize cyclic redundancy checking, may have High Speed Downlink Packet Access (HSDPA) redundancy, may have a Global System for Mobile communication (GSM) repeated Slow Associated Control Channel or Fast Associated Control Channel, or may be any other situation where blocks are transmitted repeatedly or with deterministic changes.

Figure 2:
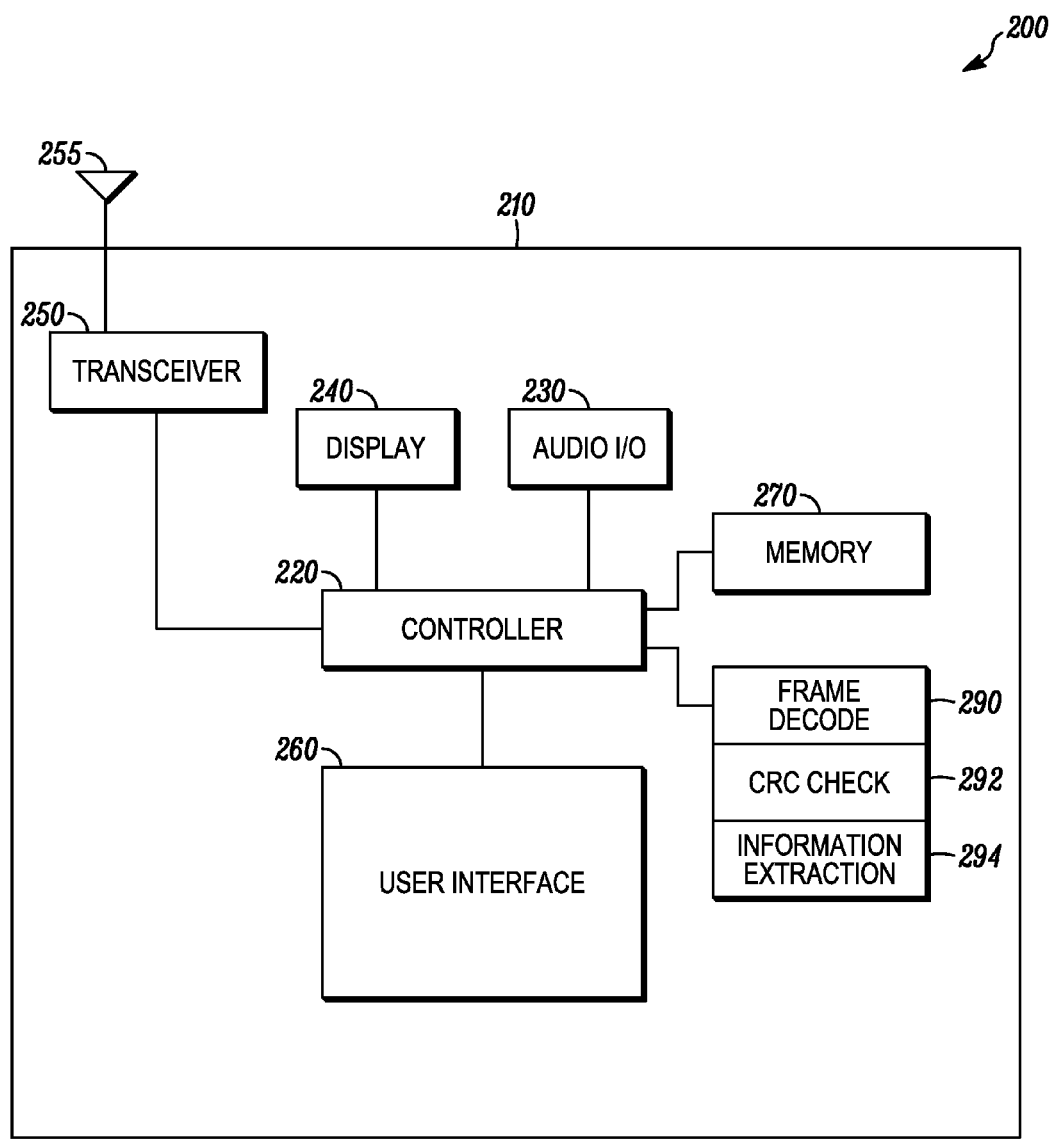
FIG. 2 illustrates an example block diagram of a wireless communication device in accordance with one embodiment.

FIG. 2 is an exemplary block diagram of a wireless communication device 200, such as the terminal 110, according to a possible embodiment. The wireless communication device 200 can include a housing 210, a controller 220 located within the housing 210, audio input and output circuitry 230 coupled to the controller 220, a display 240 coupled to the controller 220, a transceiver 250 coupled to the controller 220, an antenna 255 coupled to the transceiver 250, additional elements of a user interface 260 coupled to the controller 220, and a memory 270 coupled to the controller 220.

The wireless communication device 200 can also include a frame decode module 290, a cyclic redundancy check module 292, and an information extraction module 294. The frame decode module 290, the cyclic redundancy check module 292, and/or the information extraction module 294 can be coupled to the controller 220, can reside within the controller 220, can reside within the memory 270, can be autonomous modules, can be software, can be hardware, or can be in any other format useful for a module for a wireless communication device 200.

The display 240 can be a liquid crystal display (LCD), a light emitting diode (LED) display, a plasma display, a touch screen display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, a touch screen display, or any other device useful for providing an interface between a user and an electronic device. The memory 270 may include a random access memory, a read only memory, an optical memory, a subscriber identity module memory, or any other memory that can be coupled to a wireless communication device.

In operation, the transceiver 250 can send and receive signals over a wireless telecommunication system, such as the system 100. The transceiver 250 can acquire synchronization to first radio frame boundaries of a first physical channel from a cell, such as from the cell 140. The first physical channel can be a primary common pilot channel.

The frame decode module 290 can attempt to decode frames of a second physical channel that has second radio frame boundaries that are a multiple of the first radio frame boundaries. The second physical channel can be a primary common control physical channel. The second radio frame boundaries can be separated by an amount of time that is a multiple of an amount of time separating the first radio frame boundaries. For example, the first radio frame boundaries can be separated by 10 ms and the second radio frame boundaries can be separated by 20 ms.

The cyclic redundancy check module 292 can perform a cyclic redundancy check on the frames of the second physical channel. The information extraction module 294 can extract predictable information from a payload from frames that fail the cyclic redundancy check. The predictable information can be extracted from the entire payload, from the leading edge of the payload, from the trailing edge of the payload, or from any other subset of the payload. The predictable information can be a cell system frame number.

The controller 220 can control operations of the wireless communication device 200. The controller 220 can also validate the cell system frame number. The controller 220 can further synchronize to the cell by transmitting, via the transceiver 250, a measurement report, such as a second physical channel measurement report, for the cell if the cell system frame number is validated. For example, the controller 220 can determine a difference between the cell system frame number and a local system frame number. The controller 220 can then validate the cell system frame number if the difference between the cell system frame number and the local system frame number is similar (or repeats) over a plurality of frames. The local frame number can be a user equipment system frame number hypothesized by the user equipment. The difference between the cell system frame number and the local system frame number can be a delta system frame number (Delta SFN). The cell system frame number can be considered validated if the Delta SFN is similar over a given number of frames among a group of frames. For example, the cell system frame number can be considered validated if the Delta SFN is similar in T number of frames out of a group of X frames. The T number of frames may or may not be consecutive in the group of X frames. After the cell system frame number is validated, the wireless communication device 200 can consider itself synchronized to the cell and the wireless communication device 200 can send a measurement report for the cell and may request soft handover with the cell.

According to a related embodiment, to validate predictable information, such as the cell system frame number, the controller 220 can separate the predictable information into mutually-exclusive groups. The controller 220 can then compare different extractions of predictable information within the same group. The controller 220 can validate the predictable information if at least some of the predictable information within the one group is similar to other instances of the predictable information within the same group. To elaborate, every other extracted system frame number can be separated into separate groups. There can be two separate groups based on a primary common control physical channel frame boundary being twice the length of a radio frame boundary. Every other radio frame boundary can coincide with a primary common control physical channel frame boundary. Each group can be checked for consistency of system frame number offsets while knowing that the system frame number increments every frame.

Figure 3:
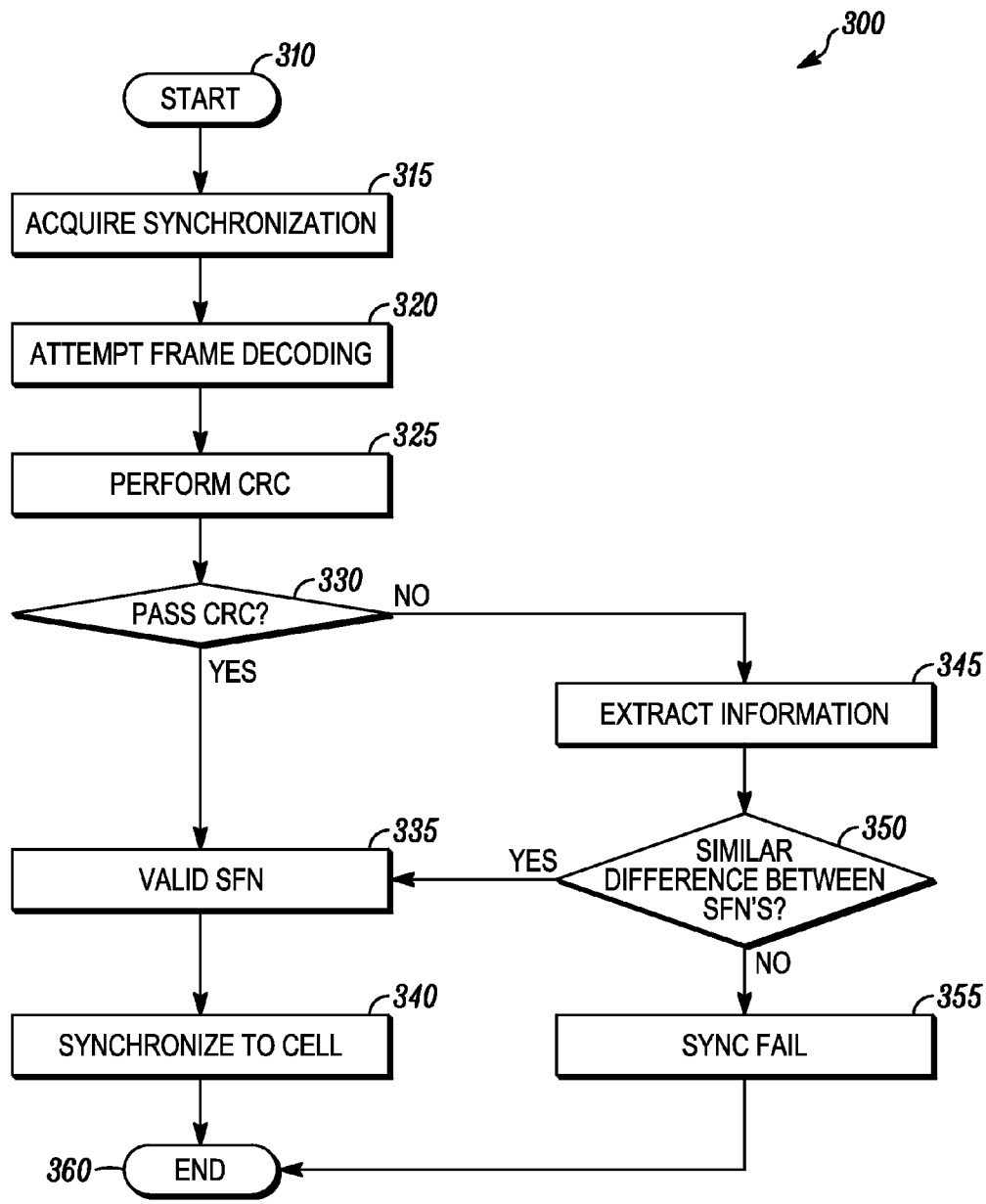
FIG. 3 shows a sample flowchart illustrating the operation of the wireless communication device of FIG. 2 in accordance with one possible embodiment.

FIG. 3 illustrates a sample flowchart 300 illustrating the operation of the wireless communication device 200 of FIG. 2 according to one possible embodiment. Blocks of the flowchart 300 can be performed by a wireless communication device, such as a universal mobile telecommunication system user equipment. At 310, the flowchart can begin.

At 315, a transceiver can acquire synchronization to first radio frame boundaries of a first physical channel that can be acquired from a cell. The first physical channel can be a primary common pilot channel. At 320, an attempt can be made to decode frames of a second physical channel that has second radio frame boundaries that are a multiple of the first radio frame boundaries. The second physical channel can be a primary common control physical channel. A separation time between the second radio frame boundaries can be a multiple of a separation time between the first radio frame boundaries. For example, the first radio frame boundaries can be separated by 10 ms and the second radio frame boundaries can be separated by 20 ms.

At 325, a cyclic redundancy check can be performed on the frames of the second physical channel. If at 330 the frames pass the cyclic redundancy check, at 335, a cell system frame number of the cell can be considered valid. At 340, synchronization can be obtained with the cell. For example, a wireless communication device can synchronize to the cell by transmitting a measurement report for the cell if the cell system frame number is validated.

If at 330 the frames fail the cyclic redundancy check, at 345, predictable information can be extracted from a payload from the frames. The predictable information can be a cell system frame number. At 350, a difference can be determined between cell system frame numbers and a local system frame number. If there is a similar or common difference between multiple extracted cell system frame numbers and the local system frame number, at 335, a cell system frame number of the cell can be considered valid. For example, the cell system can be considered valid if the difference between the cell system frame number and the local system frame number is similar over a plurality of frames. The plurality of frames may not necessarily be consecutive frames. As a further example, to determine the difference between predictable information, the predictable information can be separated into separate groups. Then, predictable information in one group can be compared with other predictable information within the same group. The predictable information can be considered valid if at least some of the predictable information within the one group is similar to the predictable information within the same group.

At 355, synchronization to the cell can fail if the frames fail the cyclic redundancy check and if repeating predictable information cannot be extracted. At 360, the flowchart 300 can end.

According to some embodiments, all of the blocks of the flowchart 300 are not necessary. Additionally, the flowchart 300 or individual blocks of the flowchart 300 may be performed numerous times, such as iteratively. For example, the flowchart 300 may loop back from later blocks to earlier blocks. Furthermore, many of the blocks can be performed concurrently or in parallel processes.

Figure 4:
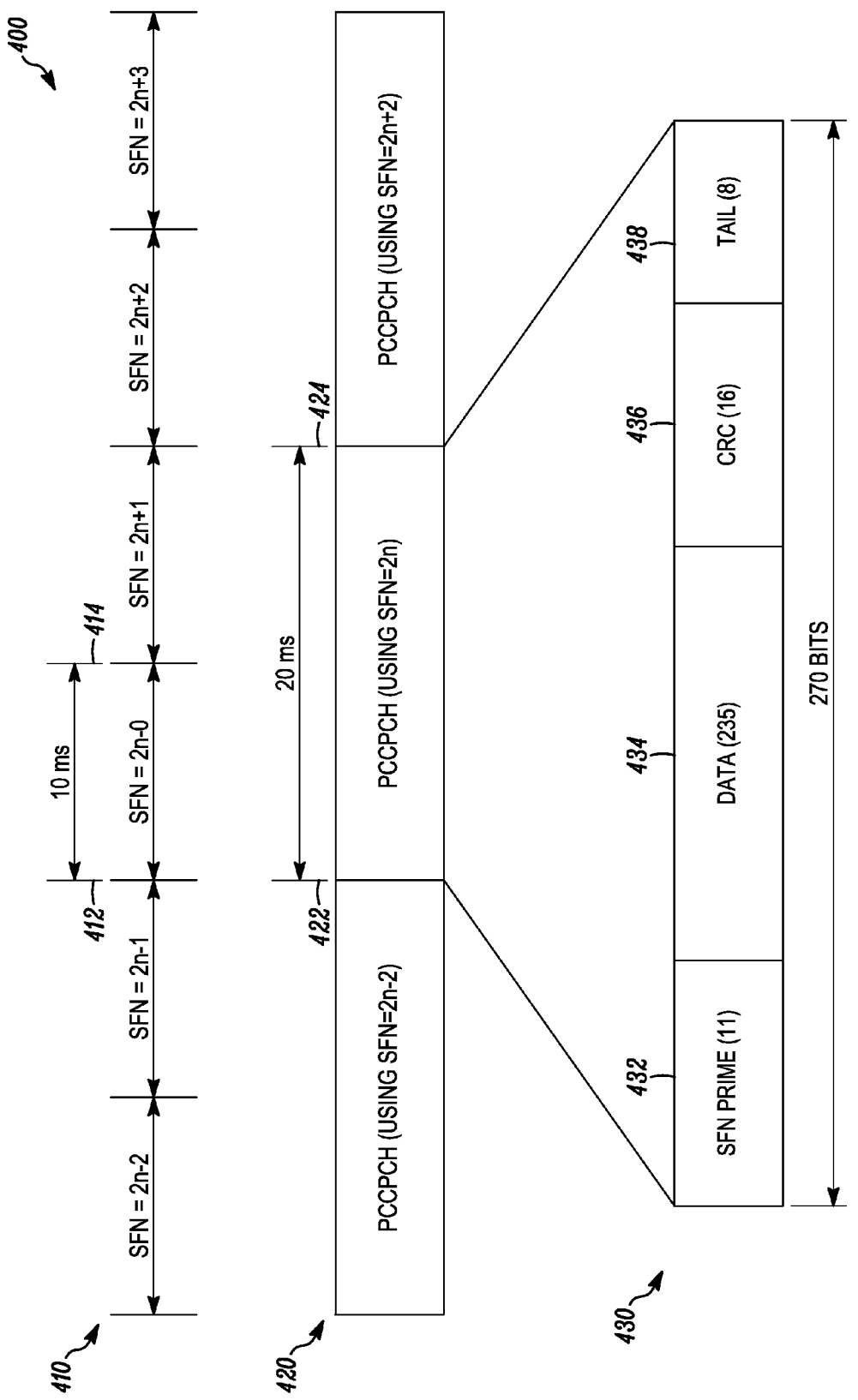
FIG. 4 shows sample physical channels transmitted by the system of FIG. 1 in accordance with one embodiment.

FIG. 4 shows sample physical channels 400 transmitted by the system of FIG. 1 in accordance with one embodiment. The physical channels 400 can include a first physical channel, such as a primary common pilot channel 410, and can include a second physical channel, such as a primary common control physical channel 420. The primary common pilot channel 410 can have radio frame boundaries 412 and 414 separated by a separation time, such as 10 ms. The primary common control physical channel 420 can include primary common control physical channel frame boundaries 422 and 424 separated by a multiple of the primary common pilot channel radio frame boundary separation time. In this example, the primary common control physical channel frame boundaries 422 and 424 can be separated by 20 ms. The primary common control physical channel 420 can include primary common control physical channel frames 430. The primary common control physical channel frames 430 can include system frame number bits 432, data 434, cyclic redundancy check bits 436, tail bits 438, and/or other data. The actual system frame number of a cell can be determined from the system frame number bits 432.

Figure 5:
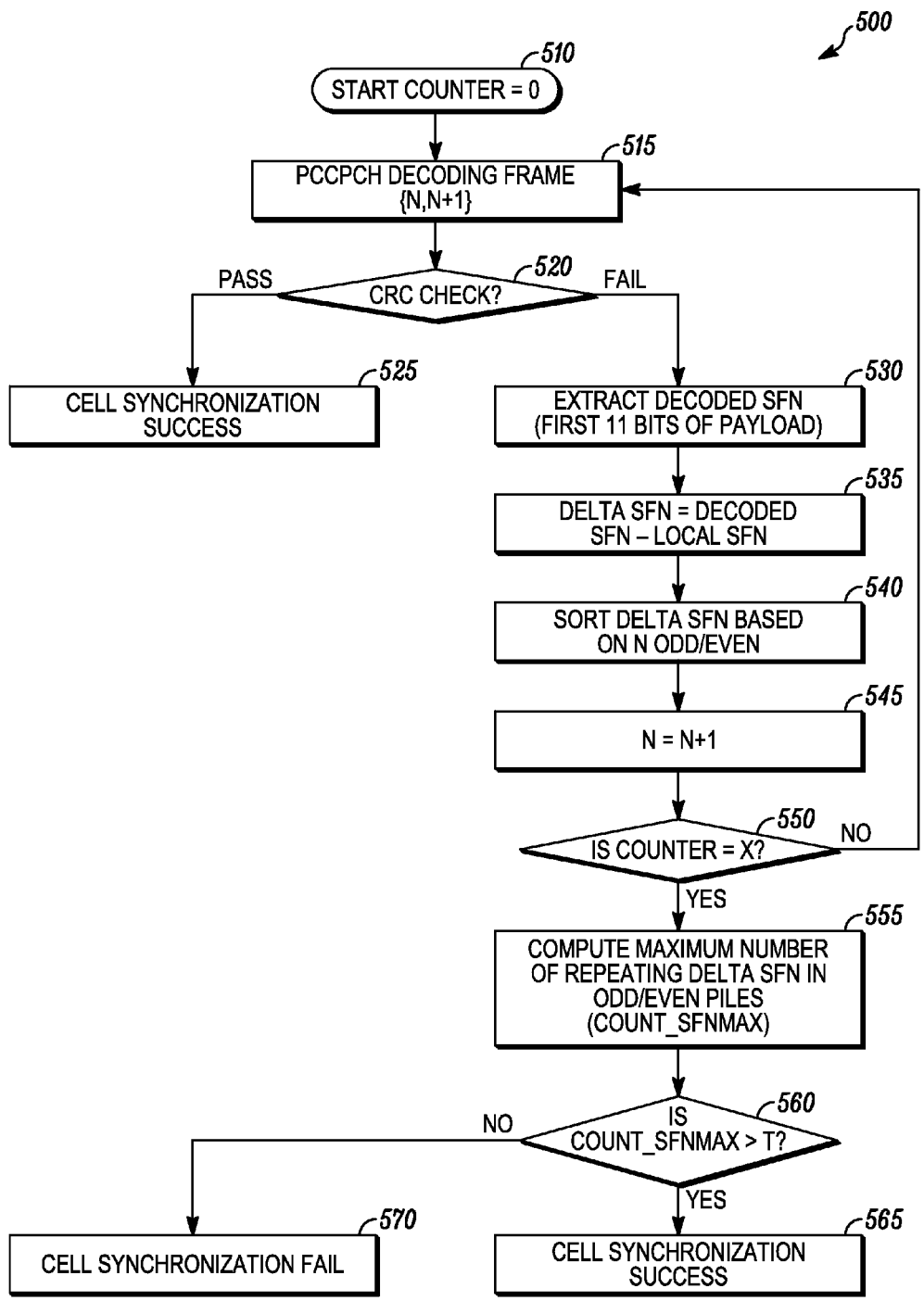
FIG. 5 shows a sample flowchart outlining the operation of the wireless communication device of FIG. 2 in accordance with another possible embodiment.

FIG. 5 shows a sample flowchart 500 outlining the operation of the wireless communication device 200 of FIG. 2 in accordance with another possible embodiment. At 510, the flowchart can begin by setting a counter, N, to zero. At 515, primary common control physical channel decoding can be performed for two radio frames N and N+1 of a cell. At 520, a cyclic redundancy check can be performed on the radio frames. If the radio frames pass the cyclic redundancy check, at 525, the wireless communication device 200 can synchronize to the cell.

If the radio frames fail the cyclic redundancy check, at 530, a decoded system frame number can be extracted from the first 11 bits of a payload of the radio frames. At 535, a difference between the decoded system frame number and a local system frame number can be determined as Delta SFN. At 540, the Delta SFN can be stored. After additional Delta SFN's are determined, they can be grouped based on the counter, N, being odd or even. At 545, the counter, N, can be incremented. At 550, the counter can be compared to a threshold, X. The threshold can be any number of iterations that can be useful for providing a sufficient sample of Delta SFN's to determine if synchronization can be performed. If the counter is below the threshold, the flowchart can return to block 515 to perform more iterations and/or obtain more Delta SFN's. If the counter meets the threshold, at 555, the total number of repeating Delta SFN's, Count_SFNmax, can be computed in each group of odd and even Delta SFN samples. At 560, Count_SFNmax can be compared to a threshold, T. The threshold, T, can be any threshold that can be useful for considering synchronization to be successful. At 565, if Count_SFNmax is greater than the threshold, T, synchronization can be performed with the cell. At 570, if Count_SFNmax is less than or equal to the threshold, T, cell synchronization can be considered a failure.

According to some embodiments, all of the blocks of the flowchart 500 are not necessary. Additionally, the flowchart 500 or blocks of the flowchart 500 may be performed numerous times, such as iteratively. For example, the flowchart 500 may loop back from later blocks to earlier blocks. Furthermore, many of the blocks can be performed concurrently or in parallel processes and can be combined or exchanged with blocks of the flowchart 300.

The methods of this disclosure may be implemented on a programmed processor. However, the operations of the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the operations of the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The term "coupled," unless otherwise modified, implies that elements may be connected together, but does not require a direct connection. For example, elements may be connected through one or more intervening elements. Furthermore, two elements may be coupled by using physical connections between the elements, by using electrical signals between the elements, by using radio frequency signals between the elements, by using optical signals between the elements, by providing functional interaction between the elements, or by otherwise relating two elements together. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method in a user equipment having a transceiver in a wireless telecommunication system, the method comprising:
   acquiring, using the transceiver, synchronization to first radio frame boundaries of a first physical channel from a cell;
   attempting to decode frames of a second physical channel that has second radio frame boundaries that are a multiple of the first radio frame boundaries;
   performing a cyclic redundancy check on the frames of the second physical channel;
   extracting predictable information, including a cell system frame number, from a payload from frames that fail the cyclic redundancy check;
   determining a difference between the cell system frame number and a local system frame number;
   validating the cell system frame number if the difference between the cell system frame number and the local system frame number is similar over a plurality of frames; and
   synchronizing to the cell by transmitting a measurement report for the cell if the cell system frame number is validated.

2. The method according to claim 1, wherein the wireless telecommunication system comprises a universal mobile telecommunication system.

3. The method according to claim 1, wherein the first physical channel comprises a primary common pilot channel and wherein the second physical channel comprises a primary common control physical channel.

4. The method according to claim 1, wherein a separation time between consecutive second radio frame boundaries is a multiple of a separation time between consecutive first radio frame boundaries.

5. The method according to claim 1,
wherein the first radio frame boundaries comprise radio frame boundaries separated by 10 ms, and
wherein the second radio frame boundaries comprise radio frame boundaries separated by 20 ms.

6. An apparatus comprising:
a transceiver configured to send and receive signals over a wireless telecommunication system and configured to acquire synchronization to first radio frame boundaries of a first physical channel from a cell;
a controller configured to control operations of the apparatus;
a frame decode module coupled to the controller, the frame decode module configured to attempt to decode frames of a second physical channel that has second radio frame boundaries that are a multiple of the first radio frame boundaries;
a cyclic redundancy check module coupled to the controller, the cyclic redundancy check module configured to perform a cyclic redundancy check on the frames of the second physical channel; and
an information extraction module coupled to the controller, the information extraction module configured to extract predictable information, including a cell system frame number, from a payload from frames that fail the cyclic redundancy check;
wherein the controller is configured to determine a difference between the cell system frame number and a local system frame number, configured to validate the cell system frame number if the difference between the cell system frame number and the local system frame number is similar over a plurality of frames, and configured to synchronize to the cell by transmitting, via the transceiver, a measurement report for the cell if the cell system frame number is validated.

7. The apparatus according to claim 6, wherein the wireless telecommunication system comprises a universal mobile telecommunication system.

8. The apparatus according to claim 6, wherein the first physical channel comprises a primary common pilot channel and wherein the second physical channel comprises a primary common control physical channel.

9. The apparatus according to claim 6, wherein a separation time between the second radio frame boundaries is a multiple of a separation time between the first radio frame boundaries.

10. The apparatus according to claim 9,
wherein the first radio frame boundaries comprise radio frame boundaries separated by 10 ms, and
wherein the second radio frame boundaries comprise radio frame boundaries separated by 20 ms.

11. A method in a user equipment having a transceiver in a universal mobile telecommunication system, the method comprising:
acquiring, using the transceiver, synchronization to first radio frame boundaries of a first physical channel from a cell in the universal mobile telecommunication system, where the first radio frame boundaries are separated by a first time period;
attempting to decode frames of a second physical channel that has second radio frame boundaries that are separated by a second time period that is a multiple of the first time period;
performing a cyclic redundancy check on the frames of the second physical channel;
extracting a cell system frame number from a payload from frames that fail the cyclic redundancy check;
determining a difference between the cell system frame number and a local system frame number;
validating the cell system frame number based on finding that the difference between the cell system frame number and the local system frame number is similar over a plurality of frames; and
synchronizing to the cell by transmitting a measurement report for the cell if the cell system frame number is validated.

12. A method in a user equipment having a transceiver in a wireless telecommunication system, the method comprising:
acquiring, using the transceiver, synchronization to first radio frame boundaries of a first physical channel from a cell;
attempting to decode frames of a second physical channel that has second radio frame boundaries that are a multiple of the first radio frame boundaries;
performing a cyclic redundancy check on the frames of the second physical channel;
extracting predictable information from a payload from frames that fail the cyclic redundancy check;
separating the predictable information into separate groups;
comparing predictable information in one group with other predictable information within the same group; and
validating the predictable information if at least some of the predictable information within the one group is similar to the predictable information within the same group.

13. An apparatus comprising:
a transceiver configured to send and receive signals over a wireless telecommunication system and configured to acquire synchronization to first radio frame boundaries of a first physical channel from a cell;
a controller configured to control operations of the apparatus;
a frame decode module coupled to the controller, the frame decode module configured to attempt to decode frames of a second physical channel that has second radio frame boundaries that are a multiple of the first radio frame boundaries;
a cyclic redundancy check module coupled to the controller, the cyclic redundancy check module configured to perform a cyclic redundancy check on the frames of the second physical channel; and
an information extraction module coupled to the controller, the information extraction module configured to extract predictable information from a payload from frames that fail the cyclic redundancy check;
wherein the controller is configured to separate the predictable information into separate groups, configured to compare predictable information in one group with other predictable information within the same group, and configured to validate the predictable information if at least some of the predictable information within the one group is similar to the predictable information within the same group.

* * * * *